US008292124B2

(12) United States Patent
Guenther

(10) Patent No.: US 8,292,124 B2
(45) Date of Patent: Oct. 23, 2012

(54) DISCHARGE DEVICE

(75) Inventor: Christiane Guenther, Radolfzell (DE)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 416 days.

(21) Appl. No.: 12/592,847

(22) Filed: Dec. 3, 2009

(65) Prior Publication Data

US 2010/0133299 A1 Jun. 3, 2010

(30) Foreign Application Priority Data

Dec. 3, 2008 (DE) ......................... 10 2008 061 533

(51) Int. Cl.
*G01F 11/00* (2006.01)
*B67B 1/08* (2006.01)

(52) U.S. Cl. .................................. 222/153.13; 222/384

(58) Field of Classification Search ............. 222/153.13, 222/153.11, 384, 321.7, 402.11
See application file for complete search history.

(56) References Cited

U.S. PATENT DOCUMENTS

| | | | | |
|---|---|---|---|---|
| 3,276,641 | A | 10/1966 | Lehmann | |
| 3,820,683 | A | 6/1974 | Jasinski | |
| 3,828,982 | A | 8/1974 | Steigerwald | |
| 3,894,665 | A | 7/1975 | Swenson | |
| 4,017,009 | A | 4/1977 | Ewald et al. | |
| 4,830,224 | A | 5/1989 | Brison | |
| 5,664,703 | A * | 9/1997 | Reifenberger et al. | 222/207 |
| 7,431,181 | B2 * | 10/2008 | Masuda | 222/256 |
| 2006/0138176 | A1 | 6/2006 | Lasserre et al. | |

FOREIGN PATENT DOCUMENTS

| | | |
|---|---|---|
| DE | 33 42 885 | 6/1985 |
| DE | 33 42 885 A1 | 6/1985 |
| DE | 3342885 A1 * | 6/1985 |
| EP | 0 266 265 | 5/1988 |

* cited by examiner

*Primary Examiner* — Kevin P Shaver
*Assistant Examiner* — Charles P Cheyney
(74) *Attorney, Agent, or Firm* — Flynn, Thiel, Boutell & Tanis, P.C.

(57) ABSTRACT

A discharge device for a housing, an actuation handle, a transport device for transporting a liquid medium through a discharge opening, and a blocking device to restrict movement of the handle relative to the housing.
The blocking device comprises at least one ratchet that can be moved wherein it does not hinder the movement of the actuation handle wherein it restricts the movement of the actuation handle relative to the housing, at least one blocking handle movable in response to application of force, and at least one thrust member through which the blocking handle is operably coupled to the ratchet, whereby the thrust member is connected to the blocking handle and to the ratchet such that the application of force enables the ratchet to be moved.

12 Claims, 4 Drawing Sheets

DISCHARGE DEVICE

FIELD OF THE INVENTION

The invention relates to a discharge device for preferentially liquid media with a housing, an actuation handle that can move relative to the housing and with a transport device which is designed, in response to the movement of the actuation handle relative to the housing, to transport medium outwards through a discharge opening. A blocking device is provided through which the movement of the actuation handle relative to the housing can be restricted.

BACKGROUND OF THE INVENTION

Discharge devices for media, especially for liquid media, have been known for some time for both pharmaceutical and cosmetic purposes. The discharge devices are generally conceived so that they are provided directly with a reservoir for the medium, from which the medium is then discharged when the actuation handle is displaced manually, for instance pressed downwards.

It is further known to provide a blocking device for discharge devices which only enables actuation in a released operating mode, whilst in a blocked operating mode no discharge is possible.

SUMMARY OF THE INVENTION

The aim of the invention is to provide an especially advantageous blocking device which offers flexible use and/or comfortable handling with low manufacturing costs.

This is achieved through a generic discharge device with a blocking device having the following components in accordance with the invention. The blocking device has at least one ratchet that can be moved in a defined ratchet direction between a release position, in which it does not prevent the movement of the actuation handle, and a blocking position, in which it limits the movement of the actuation handle relative to the housing. A blocking handle is further provided that is movable in a defined blocking handle direction that differs from the ratchet direction, in response to a manual application of force. At least one thrust member is provided to couple the blocking handle and the ratchet, whereby this thrust member is connected to the blocking handle on the one hand and to the ratchet on the other hand such that application of force to the blocking handle causes the ratchet to move out of the blocking position into the release position and/or out of the release position into the blocking position.

The ratchet in this context is a structural element that interacts with the actuation handle in the blocking position in such a way that upon actuation it blocks the path to be traversed by the actuation handle. The blocking handle is a part that is movable relative to the housing, on which force can be exerted indirectly through a flexible protective cover or directly through an operator. This force exertion is transferred through the thrust member to the ratchet. The direction of movement, that is constructively provided for the blocking handle, differs from the direction of movement that is constructively provided for the ratchet, so that a flexible arrangement of the blocking handle can be realized even if the position and/or direction of movement of the ratchet is specified. The movement paths of the ratchet are preferentially in a straight line below the blocking handle, their directions enclosing an angle of more than 45°, preferentially 90°. The direction of movement of the ratchet and that of the blocking handle are preferentially orthogonal to the direction of actuation of the actuation handle. The transfer of force from the blocking handle to the ratchet is via the thrust member, which is articulated to the blocking handle on the one hand and the ratchet on the other. This thrust member changes its alignment in the course of movement of the blocking handle and the ratchet at the same time.

In another embodiment of the invention, in a state in which the ratchet is in the blocking position, through the coupling action of the thrust member the blocking handle also adopts a blocking position, in which it prevents movement of the discharge handle relative to the housing. With such an embodiment the movement of the actuation handle is realized both through the ratchet provided for this purpose and additionally through the blocking handle itself. When force is exerted on the blocking handle manually it is pressed into a position in which it blocks the movement of the actuation handle. At the same time, the ratchet is pushed into such a blocking position through the action of the thrust member, that the construction elements together reach an especially reliable blocking state.

In another embodiment of the invention the ratchet is arranged such that force can be exerted on it manually, whereby the exertion of force on the ratchet can move it from the blocking position to the release position and/or from the release position to the blocking position. With this embodiment the ratchet is itself an additional blocking handle. Force can be exerted on it either directly or indirectly through a flexible protective cover. This enables an operating concept in which the only purpose of the blocking handle is to push the ratchet via the thrust member into the blocking position or the release position, whilst a subsequent movement of the ratchet into the release position/blocking position is achieved through direct exertion of force on the ratchet.

An especially preferred embodiment has at least two ratchets, each of which is connected to the blocking handle via a thrust member, whereby the ratchets are preferentially arranged for movement in opposite directions. With such an embodiment the application of force to the blocking handle via two different thrust members leads to a displacement of two different ratchets, which move independently of each other and preferentially in different and especially in opposite directions. This enables attainment of a particularly reliable blocking state since, for example, blocking may be achieved on opposing sides of the actuation handle.

In another embodiment of the invention two blocking handles are provided, each connected to the ratchet via a thrust member, whereby the blocking handles are arranged for movement in opposite directions. With such an embodiment the force is applied to the ratchet at the same time through two thrust members, each of which is connected to a blocking handle. The arrangement of two blocking handles, preferentially arranged opposite each other, permits particularly comfortable operation, since both blocking handles can be pushed towards one another using the thumb and forefinger, to move the ratchet into the release position or the blocking position.

A particularly preferred embodiment is one with two blocking handles and two ratchets, with a thrust member between each blocking handle and each ratchet. Such an arrangement combines the above-mentioned advantages of two blocking handles and two ratchets. In addition, an especially good guiding of the blocking handles and ratchets is achieved since they are connected to the other blocking handles/ratchets in each case via two thrust members. All four thrust members are preferentially of identical length, so that they together form a rhombus, the corners of which are formed through the ratchets and blocking handles. A particularly preferred arrangement is one in which, for discharge purposes, the medium passes through a channel which is arranged within the quadrangle formed by the thrust members. With such an arrangement the blocking device takes up hardly any additional space, enabling very compact discharge devices.

In a preferred embodiment the ratchet and/or the blocking handle are arranged in guides. In their simplest form these guides may be simple grooves in which slide blocks formed on the ratchet/blocking handle are movable. The guides determine the direction of movement of the ratchet/blocking handle. The guide tracks or grooves are preferentially fixed in the housing. With one blocking member or one blocking handle which is connected through two thrust members to two blocking handles/blocking members, it is possible to do without one guide, since the two thrust members ensure sufficient guiding.

With regard to the nature of the connection of the ratchet/blocking handle to the thrust member, the thrust member may form a separate component, which through a joint with a pin and a corresponding recess can ensure relative movement between the blocking handle/ratchet and the thrust member.

An inexpensive alternative to the arrangement with a plurality of joints is if a one-piece, deformable component is provided which embraces a plurality of thrust members and/or embraces one thrust member or a plurality of thrust members on the one hand and one blocking handle and/or one ratchet on the other hand. With such an arrangement four thrust members, for example, can be provided as a single part to together form a rhombus, which undergoes deformation in the region of the corners in the course of movement of the blocking device into the blocking state or the release state. A particular advantage with this arrangement is that the one-piece part has tapering in the regions intended for deformation, for instance in the corner regions of a one-piece rhombus, for instance in the form of film hinges. In such cases, for instance, a relative movement of the different thrust members towards one another is possible, without any major deformation of the thrust members themselves.

In a special arrangement of the discharge device, force is exerted on the blocking member continuously in the direction of its blocking position, for instance through the force of a spring. With such an arrangement, the blocking state is achieved automatically if there is no force exerted manually on the blocking handle. This arrangement prevents a failure of the discharge device to return to the blocking state owing to forgetfulness on the part of the user.

An especially preferred arrangement, however, is one in which the blocking device is in bistable form, so that without manual exertion of force the blocking member remains in its blocking position/release position. With such an arrangement, there is no automatic movement of the blocking member into its blocking position. Instead, the position that is achieved through manual exertion of force is retained. The persistence of the blocking member in its release/blocking position is achieved in the simplest case through static friction, for instance in the region of a guide track or guide groove.

To enable the blocking state/release state to be reliably maintained, an additional holding means is preferentially provided which is arranged such that a higher manual force has to be applied temporarily to move the ratchet into the release position or blocking position. With such an arrangement, a holding means, for instance a cam, makes movement of the ratchet in particular into the release position more difficult, thus preventing accidental switching to the release state. This can be achieved through the aforementioned cam, which is preferentially provided on the housing in an elastically deflectable manner and which in the blocking position of the blocking member is retracted into a recess assigned to the blocking member.

In a specially preferred embodiment of the invention the blocking device is arranged between the actuation handle and the housing, whereby a flexible and preferably annular protective surface is provided between the housing and the actuation handle and shields the blocking device at least in sections externally.

This protective surface protects the blocking device and prevents the entry of objects into the blocking device which could prevent its correct functioning. With such an embodiment, the manual application of force on the blocking handle and if necessary on the ratchet required to achieve the release state and the blocking state is achieved through the flexible outer surface, whereby markings are preferentially provided on the outer surface to show the position of ratchets and/or the blocking handles.

BRIEF DESCRIPTION OF THE DRAWINGS

Further aspects and advantages of the invention are evident from the claims and also from the following description of two preferred embodiment examples of the invention. The Figures are:

DETAILED DESCRIPTION

Figure 1A:
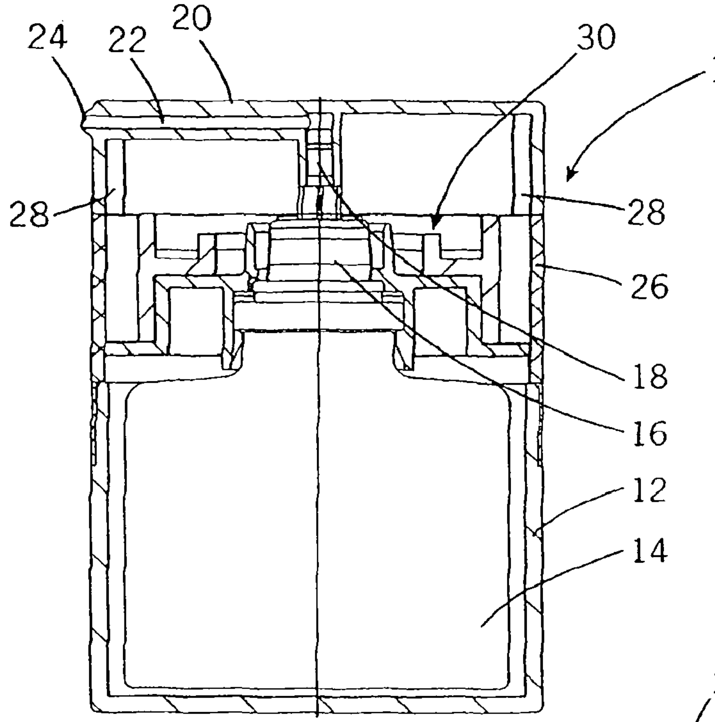
FIGS. 1*a* and 1*b* illustrate a discharge device according to the invention in a cut-away side view and a cut-away perspective view, respectively.
Figure 1B:
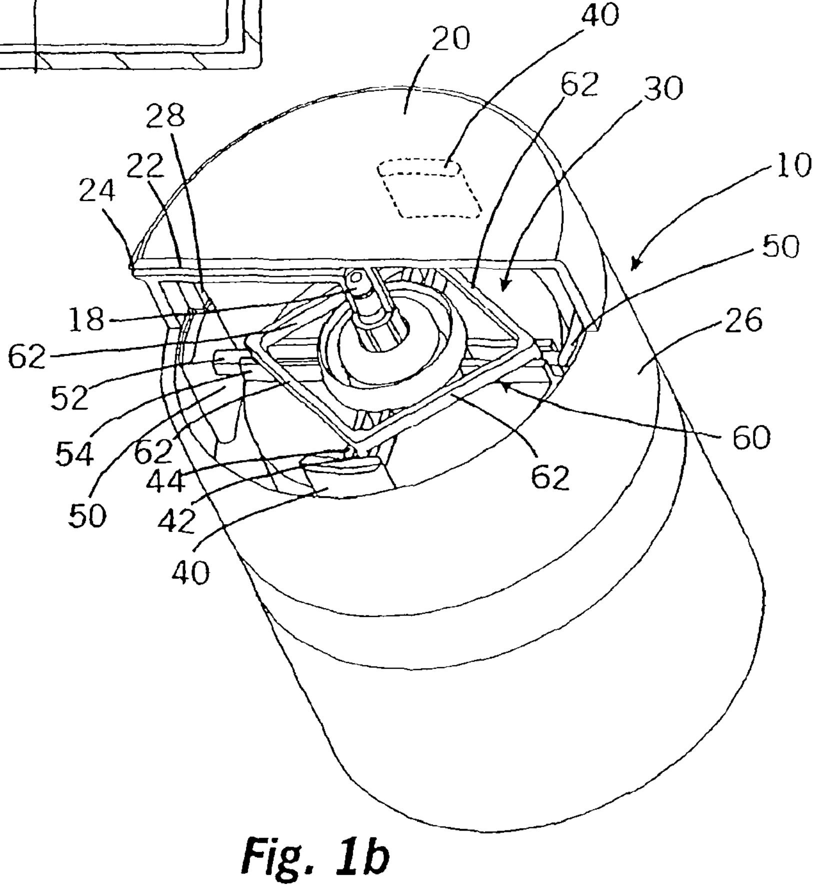

FIGS. 1*a* and 1*b* show the structure of the discharge device. The discharge device 10 has a housing 12 into which a pump dispenser 14 with a pump device 16 is inserted. The pump device 16 is arranged such that it can be actuated by pressing down on a nozzle 18 and in response medium is transferred from a reservoir of the pump dispenser 14 outwards through the nozzle 18. An actuation handle 20 is provided on the nozzle 18 and embraces a discharge channel 22 through which medium is channeled to a discharge opening 24 after exiting from the nozzle 18. A flexible annular wall 26 is provided between the housing 12 and the actuation handle 20, the lower end of which is secured to the housing 12, and the upper end of which is secured to the actuation handle 20. This annular wall 26 protects a blocking device 30 which is arranged between the housing 12 and the actuation handle 20.

This blocking device 30 is particularly recognisable in FIG. 1*b*. The blocking device 30 has two blocking handles 40, which are arranged facing each other on the sides of the discharge device within the flexible annular wall 26. Two ratchets 50 are arranged at 90° to these blocking handles 40 and are also protected in the edge region of the discharge device by the flexible annular wall 26.

The blocking handles 40 and the ratchets 50 each have a radially extending guide pin 42, 52. These guide pins 42, 52 are provided in groove-like guides 44, 54 that are fixed in position relative to the housing.

The directions of movement of the blocking handles 40 and the ratchets 50 are defined by these guides 44, 54 and the guide pins 42, 52. All four blocking handles 40 and ratchets

50 can only undergo movement in a radial direction and a straight line. A total of four thrust members 62 are provided for operative coupling of the blocking handles 40 to the ratchets 50, and together form a rhombus 60. The guide pins 42, 52 of the blocking handles 40 and ratchets 50 are connected as one piece with the corner regions of this rhombus 60. This brings about an operable coupling between the blocking handles 40 and the ratchets 50. This operable coupling is described in more detail with reference to FIGS. 2*a* to 3*b*.

Figure 2A:
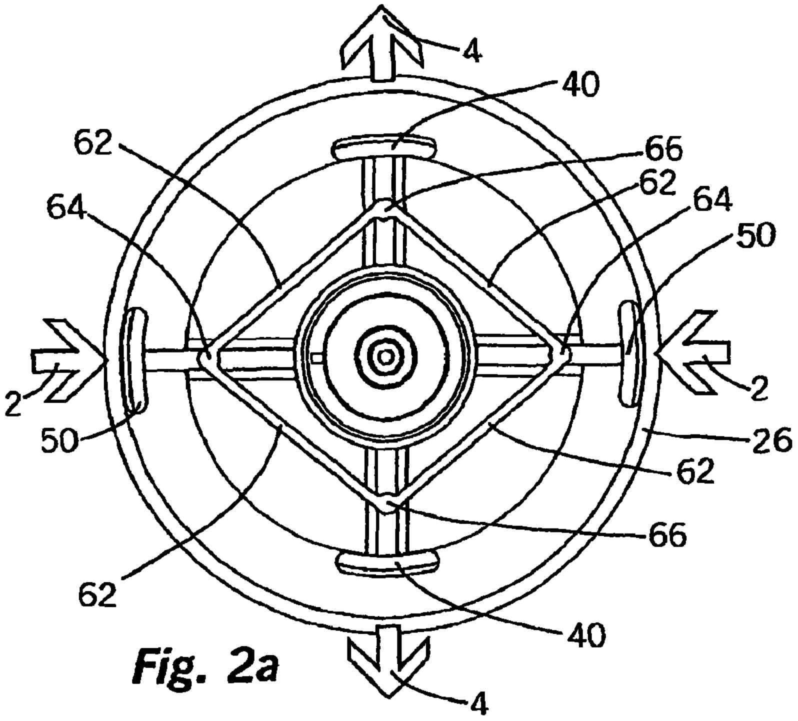
FIGS. 2*a* and 2*b* illustrate a blocking state of the discharge device in a top view and a perspective view, respectively.
Figure 2B:
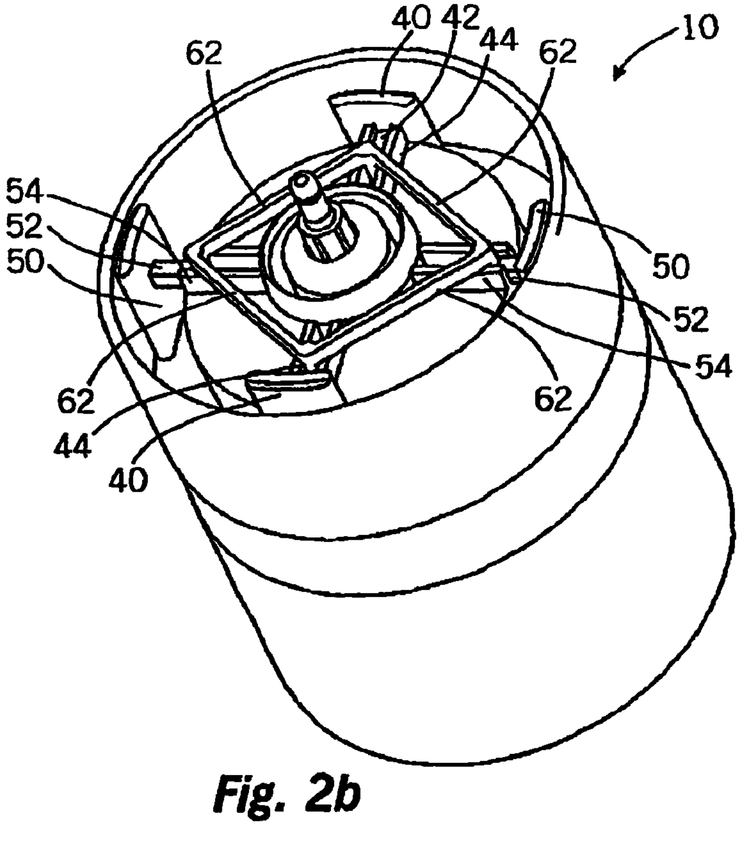

FIGS. 2*a* and 2*b* show the blocked state of the discharge device. FIG. 2*a* shows a view from above with the actuation handle 20 removed. In the blocked state the ratchets 50 are in an outer distal end position and lie directly against the annular wall 26. Since the two corner points 64 of the rhombus 60 assigned to the ratchets 50 are at a maximum distance apart because of this distal end position, the other two corner points 66 of the rhombus 60 are at a minimum distance apart.

In this position actuation of the discharge device is not possible since pressing down on the actuation handle 20 will cause the ribs 28 shown in FIGS. 1*a* and 1*b* to collide with the ratchets 50 in their outer position. Even if force is applied accidentally to the actuation handle 20, this will not result in a discharge process.

To move the discharge device into a release state in which a discharge process is possible, the ratchets 50 are pressed together in the direction of arrow 2 through the annular wall 26. This results, because of the operative coupling via the rhombus 60, in the corner points 66 becoming increasingly further apart in the direction of the arrow 4, and the blocking handles 40 therefore being pressed apart.

Figure 3A:
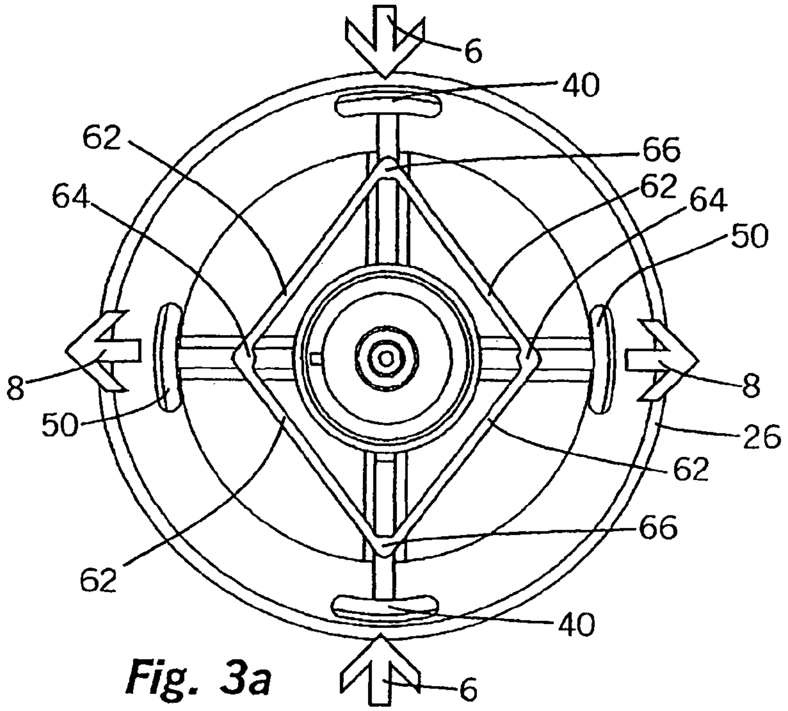
FIGS. 3*a* and 3*b* illustrate a release state of the discharge device in a top view and a perspective view, respectively.
Figure 3B:
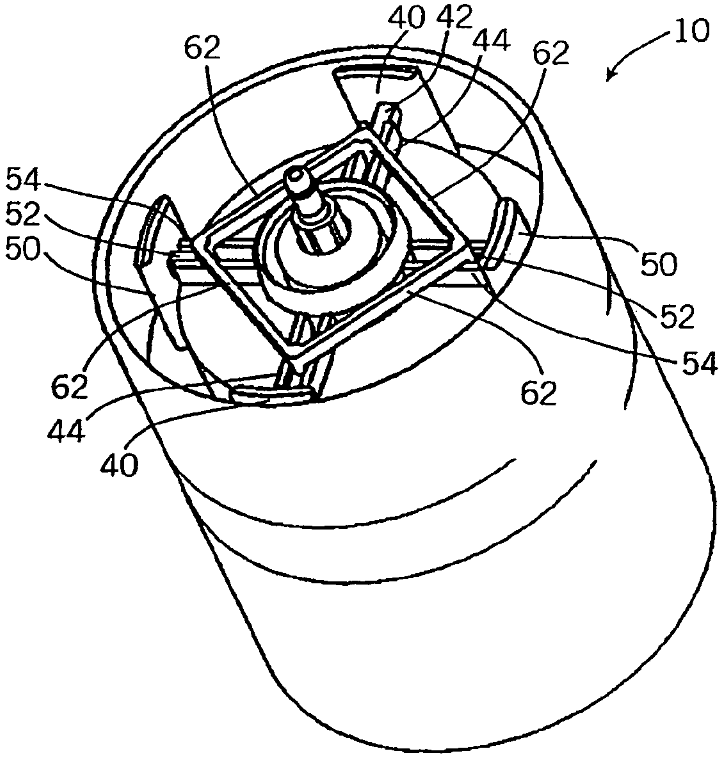

The state that can be achieved through this is shown in FIGS. 3*a* and 3*b*. In this release state the blocking handles 40 and corner points 66 are at a maximum distance apart, whilst the ratchets 50 are in a proximal inner end position relative to the central axis of the device. In this state actuation is possible since the ribs 28 are no longer in contact with the inwardly displaced ratchets 50 when the actuation handle 20 is pressed downwards. During the actuation process the flexible annular wall 26 is deformed to enable movement of the actuation handle 20 in the direction of the housing 12.

If the blocking state is desired after one or more discharge procedures, then the blocking handles 40 are pressed towards each other through the annular wall 26 in the direction 6, whereby this leads via the thrust members 62 of the rhombus 60 to the ratchets 50 being pressed outwardly in direction 8. The blocking state shown in FIGS. 2*a* and 2*b* can thereby be restored.

A particularly reliable blocking device can be obtained in an inexpensive manner through the arrangement shown. With the embodiment shown the blocking handles 40, the ratchets 50, the guide pins 42, 52 and the rhombus 60 form a one-piece plastic component with the four thrust members 62, which forms a particularly inexpensive example of the arrangement that is easily to assemble.

Figure 4A:
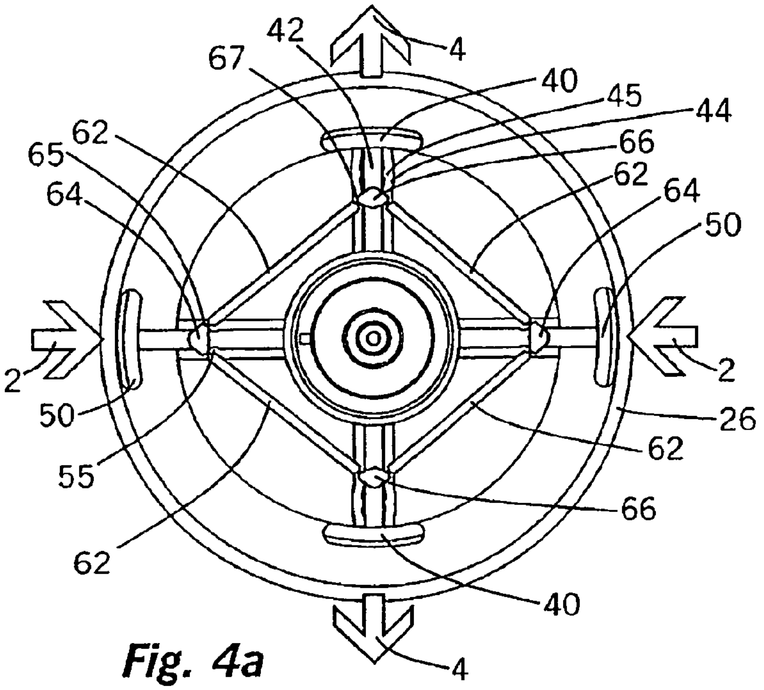
FIGS. 4*a* and 4*b* illustrate a second embodiment in the blocking state and in the release state, respectively, each shown from the top.
Figure 4B:
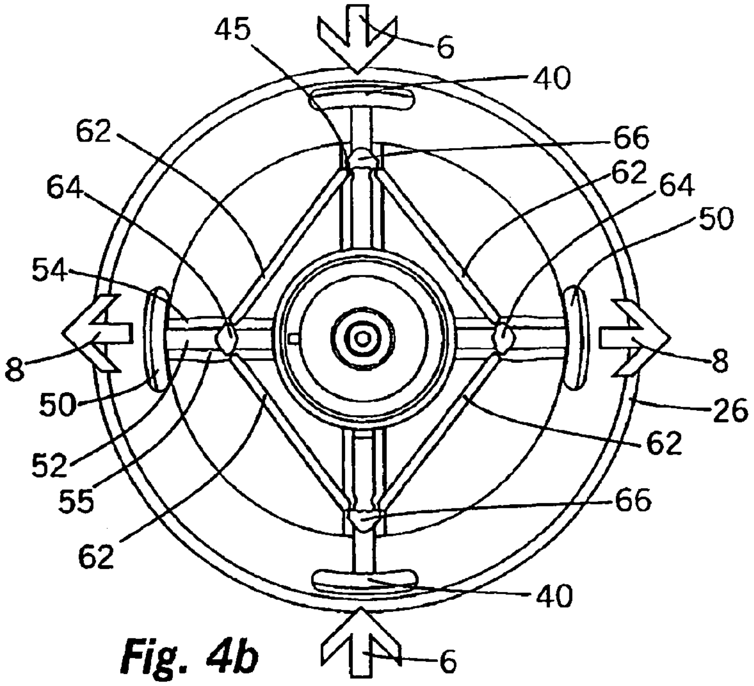

An alternative embodiment is shown in FIGS. 4*a* and 4*b* which differs from the embodiment in FIGS. 1 to 3 only in terms of details. This second embodiment is shown in a blocked state in FIG. 4*a* and in a released state in FIG. 4*b*.

One of the ways in which this embodiment differs from that above is that two film hinges 65, 67 are provided in the corner regions 64, 66 of the rhombus 60 which make a swivel movement of the thrust members 62 easier. As an alternative, the afore-mentioned parts 62, 64, 66 can be provided at least in part as separate parts that are connected to one another to enable swivel motion. It is, for example, possible in an advantageous manner to provide upwardly-facing nozzle joints on the guide pins 42, 52, on which the thrust members, separated from each other, can be placed through joint boreholes in the thrust members 62. A further difference between this embodiment and that in FIGS. 1*a* to 3*b* is that the embodiment shown in FIGS. 4*a* and 4*b* has inwardly-facing cams 45, 55 on the guides 44, 54. The cams 55 result in stabilization in the blocking state shown in Figure FIG. 4*a*, since a movement of the ratchets 50 in the direction of the release state shown in FIG. 4*b*, i.e., in the inward direction 2, is only possible with a slight deflection of the side faces of the guide 54 by the guide pins 52. This deflection is shown in FIG. 4*b*. In the released state in FIG. 4*b* that state is stabilized by the cams 45 on the guide 44. Movement of the blocking handles 40 in the direction of the blocking position, i.e., inwardly in direction 6, is only possible through the application of sufficient force to deflect the side faces of the guide 44 together with the blocking cams 45 attached thereto in an outward direction. This deflected state of the cams 45 is shown in FIG. 4*a*.

In a further alternative embodiment not shown, in addition to the ribs 28 on the actuation handle 20 there are further ribs displaced through 90° that are not as far from the nozzle 18. These further ribs work in conjunction with the blocking handles 40 so that in the blocking state shown in FIGS. 2*a*, 2*b* blocking results both in the region of the ratchets 50 and in the region of the blocking handles 40.

The embodiments shown in FIGS. 1*a* to 4*b* are characterized by an especially reliable operating mode because of the rhombus 60. Alternative embodiments, however, may have less than the four thrust members 62 that together form the rhombus 60. The basic functionality is already achievable with an arrangement having just one blocking handle 40 and just one ratchet 50, connected through one thrust member 62. An intermediate arrangement has two ratchets, but only one blocking handle, or alternatively two blocking handles, but just one ratchet.

The invention claimed is:

1. A discharge device for liquid media comprising:

a housing;

an actuation handle that is arranged such that the actuation handle moves relative to the housing;

a transport device which is formed such that, in response to a movement of the actuation handle relative to the housing, medium is transported through a discharge opening; and a blocking device through which the movement of the actuation handle relative to the housing is restricted;

wherein the blocking device comprises:

at least one ratchet which is movable in a defined ratchet direction between a release position in which the at least one ratchet does not hinder the movement of the actuation handle and a blocking position in which the at least one ratchet restricts the movement of the actuation handle relative to the housing;

at least one blocking handle that is movable in a defined blocking handle direction, that differs from the defined ratchet direction, in response to a manual application of force; and at least one thrust member through which the at least one blocking handle is operably coupled to the at least one ratchet, wherein the at least one thrust member is articulated a first direction to the at least one blocking handle and a second direction to the at least one ratchet, such that upon application of force to the at least one blocking handle, the at least one ratchet is moved from the blocking position into the release position and/or from the release position into the blocking position.

2. The discharge device according to claim 1, wherein, in a state in which the at least one ratchet is in the blocking position, through operative coupling via the at least one thrust member, the at least one blocking handle also adopts a blocking position in which the at least one blocking handle hinders the movement of the actuation handle relative to the housing.

3. The discharge device according to claim 1, wherein the at least one ratchet is arranged such that force can be applied to the at least one ratchet manually, whereby application of force to the at least one ratchet can move the at least one ratchet from the blocking position into the release position and/or from the release position into the blocking position.

4. The discharge device according to claim 1, wherein the at least one ratchet comprises at least two ratchets and the at least one thrust member comprises two thrust members, each of the at least two ratchets being connected via one of the thrust members to the at least one blocking handle, whereby the at least two ratchets are formed for movement in opposing directions.

5. The discharge device according to claim 1, wherein the at least one blocking handle comprises at least two blocking handles and the at least one thrust member comprises two thrust members, each of the at least two blocking handles being connected via one of the thrust members to the at least one ratchet, whereby the at least two blocking handles are formed for movement in opposing directions.

6. The discharge device according to claim 5, wherein the at least one blocking handle comprises two blocking handles, the at least one thrust member comprises two thrust members, and the at least one ratchet comprises two ratchets, whereby one of the thrust members is provided between each of the two blocking handles and each of the two ratchets.

7. The discharge device according to claim 1, wherein the at least one ratchet and/or the at least one blocking handle is guided in guides.

8. The discharge device according to claim 1, further including a one-piece elastically deformable component comprising either: a plurality of the thrust members or the at least one thrust member along with the at least one blocking handle and/or the at least one ratchet.

9. The discharge device according to claim 1, wherein the blocking mechanism is bistable, so that without the manual application of force, the at least one ratchet remains in the blocking position and in the release position.

10. The discharge device according to claim 1, wherein the blocking device is provided with one retaining means which is formed such that a higher manual application of force is required temporarily to move the at least one ratchet into the release position or the blocking position.

11. The discharge device according to claim 10, wherein the retaining means comprises a deflectable cam.

12. The discharge device according to claim 1, wherein the blocking device is arranged between the actuation handle and the housing, whereby a flexible and annular outer surface is arranged between the housing and the actuation handle, which shields the blocking device from the exterior, at least in sections.

* * * * *